(12) United States Patent
Okada

(10) Patent No.: US 10,074,883 B2
(45) Date of Patent: Sep. 11, 2018

(54) ASSEMBLED BATTERY AND VEHICLE PROVIDED WITH SAME

(71) Applicant: SANYO Electric Co., Ltd., Osaka (JP)

(72) Inventor: Wataru Okada, Hyogo (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 0 days.

(21) Appl. No.: 15/125,050

(22) PCT Filed: Apr. 24, 2015

(86) PCT No.: PCT/JP2015/002225
§ 371 (c)(1),
(2) Date: Sep. 9, 2016

(87) PCT Pub. No.: WO2015/162938
PCT Pub. Date: Oct. 29, 2015

(65) Prior Publication Data
US 2017/0025724 A1    Jan. 26, 2017

(30) Foreign Application Priority Data

Apr. 25, 2014 (JP) ................................. 2014-091017

(51) Int. Cl.
*H01M 10/6557* (2014.01)
*H01M 10/6556* (2014.01)
(Continued)

(52) U.S. Cl.
CPC ..... *H01M 10/6557* (2015.04); *H01M 2/1077* (2013.01); *H01M 10/613* (2015.04);
(Continued)

(58) Field of Classification Search
None
See application file for complete search history.

(56) References Cited

U.S. PATENT DOCUMENTS

2008/0160395 A1* 7/2008 Okada ................... B60L 3/0046
429/99
2012/0003526 A1* 1/2012 Kume ................. H01M 2/0262
429/151
(Continued)

FOREIGN PATENT DOCUMENTS

JP    2008-166191    7/2008
JP    2012-14962     1/2012
(Continued)

OTHER PUBLICATIONS

International Search Report of PCT application No. PCT/JP2015/002225 dated Aug. 4, 2015.

*Primary Examiner* — Yoshitoshi Takeuchi
(74) *Attorney, Agent, or Firm* — Wenderoth, Lind & Ponack, L.L.P.

(57) ABSTRACT

A highly reliable assembled battery has first passages formed between a first rectangular cell and a first surface of the body part of a separator, and has second passages formed between a second rectangular cell and the second surface of the body part of the separator in an alternating manner from above to below. Openings are provided in a side wall part of the separator. The first passages and the second passages are exposed by the openings.

5 Claims, 13 Drawing Sheets

(51) Int. Cl.
*H01M 10/613* (2014.01)
*H01M 10/625* (2014.01)
*H01M 10/647* (2014.01)
*H01M 10/6561* (2014.01)
*H01M 2/10* (2006.01)

(52) U.S. Cl.
CPC ....... *H01M 10/625* (2015.04); *H01M 10/647* (2015.04); *H01M 10/6561* (2015.04); *H01M 2220/20* (2013.01)

(56) References Cited

U.S. PATENT DOCUMENTS

| | | |
|---|---|---|
| 2012/0177979 A1 | 7/2012 | Jin |
| 2012/0315519 A1 | 12/2012 | Jin |
| 2014/0014420 A1* | 1/2014 | Nakamura .......... H01M 2/1077 180/65.1 |
| 2017/0025724 A1* | 1/2017 | Okada ................. H01M 10/625 |

FOREIGN PATENT DOCUMENTS

| | | |
|---|---|---|
| JP | 2012-146657 | 8/2012 |
| JP | 2013-004523 | 1/2013 |
| WO | 2013/084290 | 6/2013 |

* cited by examiner

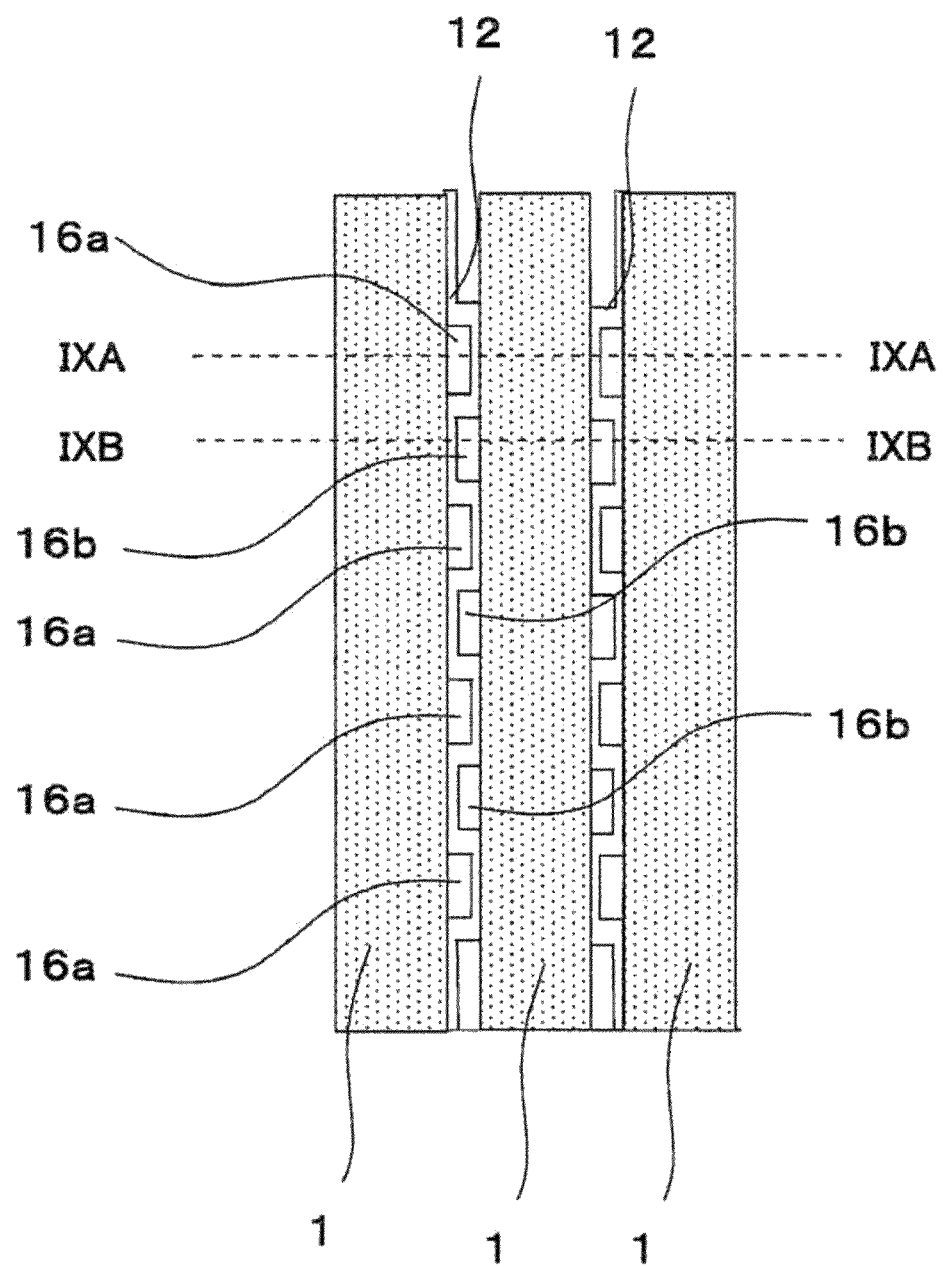

ASSEMBLED BATTERY AND VEHICLE PROVIDED WITH SAME

CROSS-REFERENCE TO RELATED APPLICATIONS

This application is a U.S. national stage application of the PCT International Application No. PCT/JP2015/002225 filed on Apr. 24, 2015, which claims the benefit of foreign priority of Japanese patent application No. 2014-091017 filed on Apr. 25, 2014, the contents all of which are incorporated herein by reference.

TECHNICAL FIELD

The present invention relates to an assembled battery where a plurality of rectangular battery cells are stacked through separators, and a vehicle including the same.

BACKGROUND ART

Conventionally, in a hybrid vehicle or an electric vehicle having a driving source of electric power, an assembled battery has a plurality of rectangular battery cells connected in series or parallel.

In the assembled battery, a separator is disposed between adjacent rectangular battery cells. This separator plays a role to prevent rectangular battery cells from directly contacting each other. Additionally, projections and depressions are formed on the separator, and thus passages for cooling gas flowing between the rectangular battery cell and the separator are formed. Then, when the rectangular battery cell generates heat, the rectangular battery cell can be cooled by making the cooling gas flow through the passage.

Japanese Laid-Open Patent Publication No. 2013-004523 discloses the following. The projection is provided at the base part of the cell barrier (separator), a passage where heat exchange medium passes, is provided between the cell barrier and the battery cell. Further, the cell barrier has the flange part, an opening is provided at the flange part.

Technical Problem

In an assembled battery which in used in a hybrid vehicle or an electric vehicle, it is necessary to prevent the assembled battery from being damaged in which an abnormality of the rectangular battery cell happens, even when the vehicle is damaged by a car accident and a strong impact is exerted on the assembled battery. An object of the present invention is to provide an assembled battery where a cooling performance of a rectangular battery cell is maintained and a high reliability is obtained.

SUMMARY OF THE INVENTION

According to an assembled battery in one aspect of the present invention, an assembled battery comprises: a pair of end plates; and a plurality of rectangular battery cells stacked through separators, between the pair of the end plates, interposing.

Each of the rectangular battery cells has a bottom surface, a pair of large area side surfaces, and a small area side surface, and then each of the separators has a body part and a pair of side wall parts provided at both ends in a width direction of the body part, and then the body part is disposed between adjacent battery cells of the rectangular battery cells.

The body part has vertical portions vertically extending in an alternating manner from above to below and a horizontal portion horizontally extending, and an end part of each of the vertical portions is connected to an end part of the horizontal portion.

A first passage where heat exchange gas passes is formed between a first surface of the body part of each of the separators and a first adjacent battery cell of the rectangular battery cells, and then a second passage where heat exchange gas passes is formed between a second surface of the body part of each of the separators and a second adjacent battery cell of the rectangular battery cells. Then the first passage and the second passage are provided in an alternating manner from above to below.

The side wall parts of each of the separators are disposed so as to face the small area side surfaces of the adjacent two rectangular battery cells, and then each of the side wall parts has an opening, and then at least one of the first passage and the second passage are exposed through the opening.

Advantageous Effects of Invention

According to an assembled battery in one aspect of the present invention, the small area side surface of the rectangular battery cell can be covered with the side wall parts of the separators. Therefore, an impact exerted directly on the rectangular battery cell is prevented, even when a strong impact is exerted on the assembled battery by a car accident. Thus, the small area side surface of the rectangular battery cell being damaged or broken by components constituting the assembled battery or the vehicle by a car accident and the abnormality of the rectangular battery cell happening is effectively prevented.

According to an assembled battery in one aspect of the present invention, passages through which heat exchange gas flows between the separator and the rectangular battery are formed. Then, the passages are exposed through openings provided at the side wall part of the separator. Therefore, since the heat exchange gas flows into the passages, the rectangular battery cells are effectively cooled. Further, the body part of the separator has a corrugated part where the vertical portions and the horizontal portions are provided in an alternating manner. The width (a distance between the body part of the separator and the large area side surface of the rectangular battery cell) of the passage of the heat exchange gas can be larger than that of the comparison battery of FIG. 12. As a comparison, it is assumed that projection parts are formed at both surfaces of a body part as shown in FIG. 12. Thus, the heat exchange gas flows into the passage smoothly, and flows inside the passage smoothly, and then the rectangular battery cell can be effectively cooled. Therefore, according to an assembled battery in one aspect of the present invention, the assembled battery has a high cooling performance of the rectangular battery cell, and a high reliability. Here, "a vertical direction" in this description means a direction perpendicular to the bottom surface of the rectangular battery cell, and "a horizontal direction" means a direction in parallel with the bottom surface of the rectangular battery cell.

In the present invention, one or more openings may be provided at the side wall part. When the one opening is provided at the side wall part, the first passage and the second passage are exposed through this one opening. However, it is preferable that a plurality of the openings are provided at the side wall part. In this case, the first passage and the second passage are exposed through one of the openings. Otherwise, the first passage or the second passage is exposed through one of the openings. The opening through which the first passage is exposed, and the opening through which the second passage is exposed, may be provided respectively.

BRIEF DESCRIPTION OF DRAWINGS

FIG. 8 is an enlarged view of a VIII portion in FIG. 7.

DETAILED DESCRIPTION OF THE PREFERRED EMBODIMENTS

Hereinafter, embodiments of the present invention will be described in detail with reference to the figures. However, the embodiments described below are illustrative examples for embodying the technical spirit of the present invention, and are not intended to limit the present invention to the embodiments.

Figure 1:
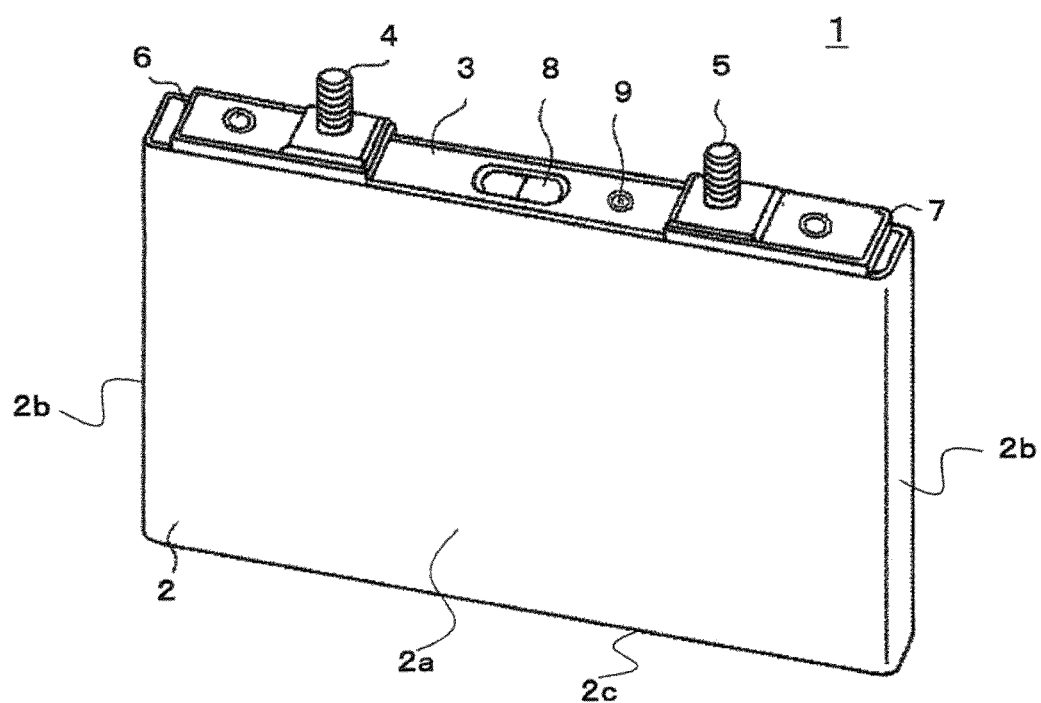
FIG. 1 is a perspective view of a rectangular battery cell used in an assembled battery relating to an embodiment.

FIG. 1 is a perspective view of rectangular battery cell 1 used in assembled battery 10 relating to an embodiment. Rectangular battery cell 1 has rectangular outer case 2 (having a rectangular parallelepiped shape) made of metal such as aluminum. In rectangular battery cell 1, an electrode assembly including a positive electrode plate and a negative electrode plate is stored in outer case 2 with an electrolyte. Rectangular outer case 2 has a rectangular piped shape having a bottom part, including a pair of large area side surfaces 2a, a pair of small area side surfaces 2b, and a bottom surface 2c. An opening of rectangular outer case 2 is sealed by sealing plate 3. Positive terminal 4 and negative terminal 5 are provided at sealing plate 3. Positive terminal 4 is electrically connected to the positive electrode plate, and negative terminal 5 is connected to the negative electrode plate. Insulation members 6, 7 made of resin are respectively interposed between positive terminal 4 and sealing plate 3, between negative terminal 5 and sealing plate 3. Gas exhaust valve 8 is provided at sealing plate 3. Gas exhaust valve 8 is broken when the inner pressure of rectangular outer case 2 becomes the preset value or more, and then gas inside rectangular outer case 2 is exhausted outside through gas exhaust valve 8. An injection hole for injecting the electrolyte is provided. After injecting, this injection hole is sealed by sealing plug 9. Here, as rectangular battery cell 1, it is preferable to use a non-aqueous electrolyte secondary cell such as a lithium ion secondary battery cell.

Figure 2:
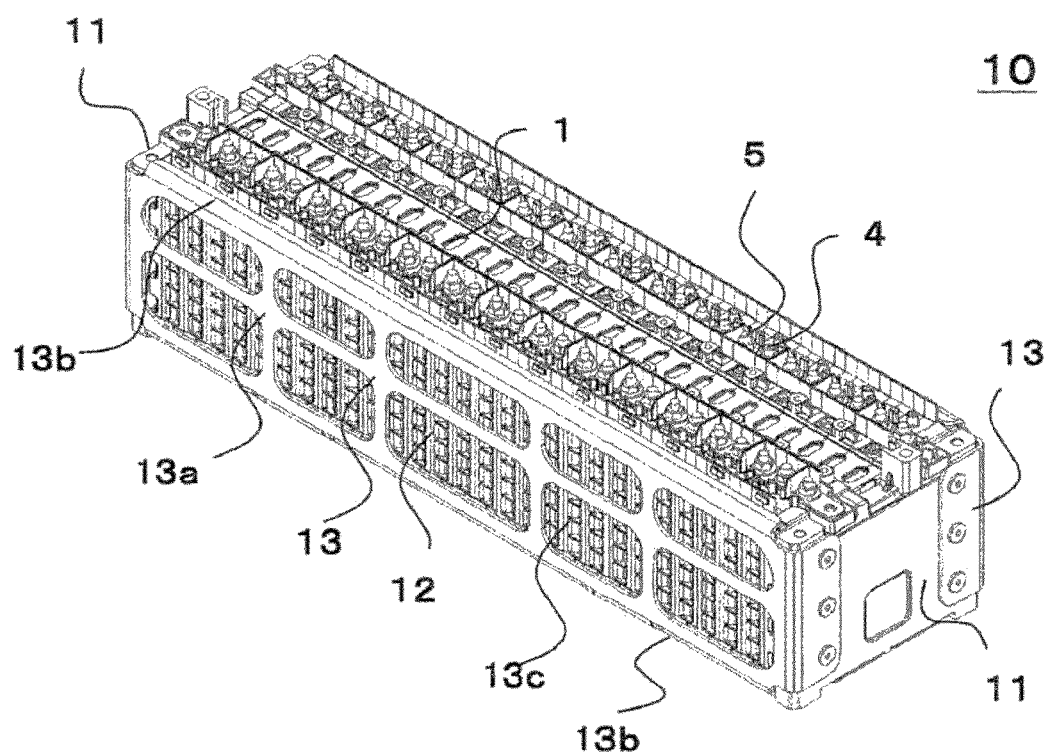
FIG. 2 is a perspective view of the assembled battery relating to the embodiment.
Figure 3A:
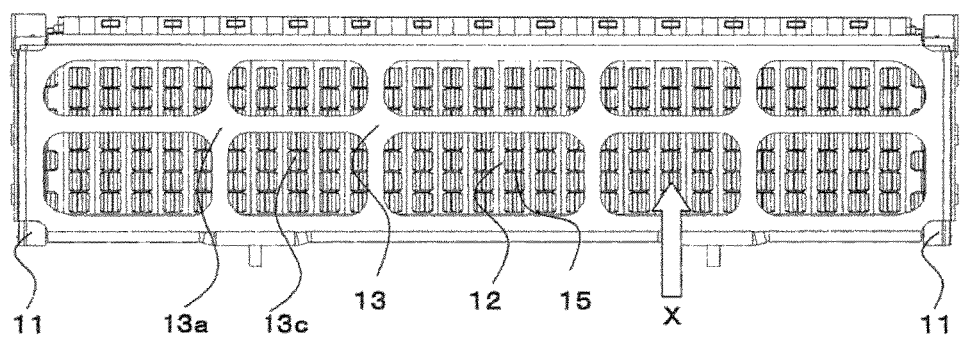
FIG. 3A is a side view of the assembled battery relating to the embodiment.
Figure 3B:
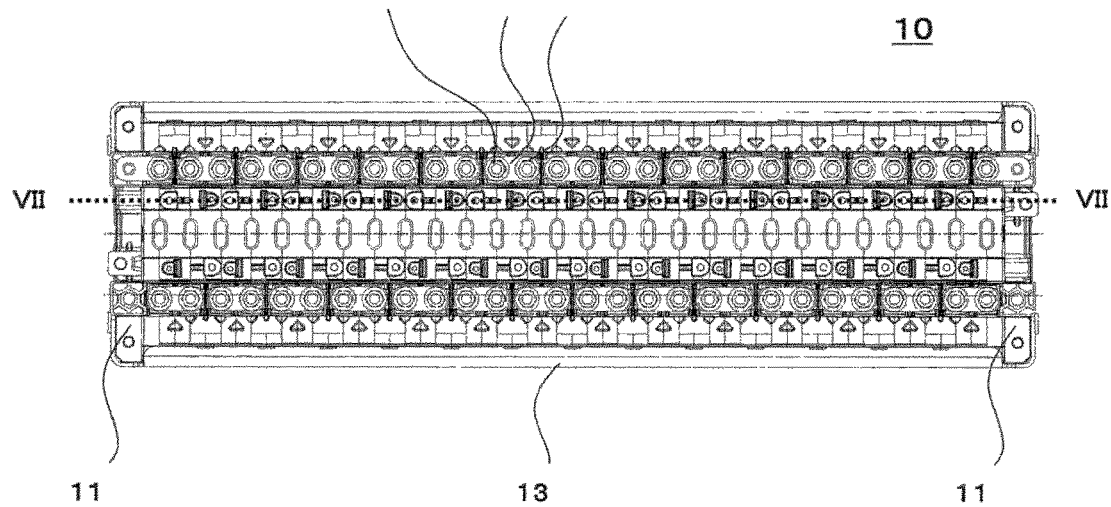
FIG. 3B is a plan view of the assembled battery relating to the embodiment.

As shown in FIG. 2, FIG. 3A, and FIG. 3B, in assembled battery 10, a plurality of rectangular battery cells 1 are stacked through separators 12, between a pair of end plates 11. Binding bars 13 are respectively connected to the pair of end plates 11, and thus the stacked plurality of rectangular battery cells 1 are bound by the pair of end plates 11 and binding bars 13. Main parts 13a of binding bars 13 are respectively disposed at side surfaces of assembled battery 10. Openings 13c are provided at main part 13a of binding bar 13. Positive terminals 4 and negative terminals 5 of adjacent rectangular battery cells 1 are electrically connected by bus-bars 14. Adjacent rectangular battery cells 1 are disposed such that large area side surfaces 2a thereof faces each other through separators 12. Separator 12 has body part 12a, and this body part 12a is disposed between adjacent rectangular battery cells 1. Accordingly, a first surface of body part 12a faces large area side surface 2a of a first rectangular battery cell 1, and a second surface of body part 12a faces large area side surface 2a of a second rectangular battery cell 1.

As shown in FIG. 4, FIGS. 5A to C, FIG. 6A, and FIG. 6B, separator 12 has body part 12a, side wall parts 12b, bottom part 12c, and upper wall part 12d.

Body part 12a of separator 12 has a corrugated part. The corrugated part has vertical portions $12a_1$ vertically extending, and horizontal portions $12a_2$ horizontally extending, in an alternating manner from above to below (see FIGS. 6A and 6B). Vertical portion $12a_1$ has a roughly rectangular shape, and its long side extends in a width direction of body part 12a. Vertical portions $12a_1$ are disposed so as to face large area side surface 2a of rectangular battery cell 1 through an insulation sheet or the like. Horizontal portion $12a_2$ is disposed so as to couple vertical portion $12a_1$ located above and vertical portion $12a_1$ located below. One end part of horizontal portion $12a_2$ is connected to the low end part of vertical portion $12a_1$, and other end part of horizontal portion $12a_2$ is connected to the upper end part of vertical portion $12a_1$ located below. Thus, in the one surface of body part 12a, a plurality of recess parts 18 extending in the width direction of body part 12 are provided at intervals. Spaces extending in the width direction of body part 12a between body part 12a and rectangular battery cell 1 are formed by the recess parts 18. Those spaces form passages 16a, 16b of heat exchange gas (see FIG. 8). Regions where the spaces are formed by recess part 18, and regions where no space is formed by contacting body parts 12a and rectangular battery cell 1, are formed in an alternating manner from above to below. Also, in the other surface of body part 12a, a plurality of recess parts 18 extending in the width direction of body part 12, are provided at intervals. Here, recess parts 18 in the other surface of body part 12a corresponds to the regions where no space is formed by contacting body parts 12a and rectangular battery cell 1 in the one surface of body part 12a.

Figure 7:
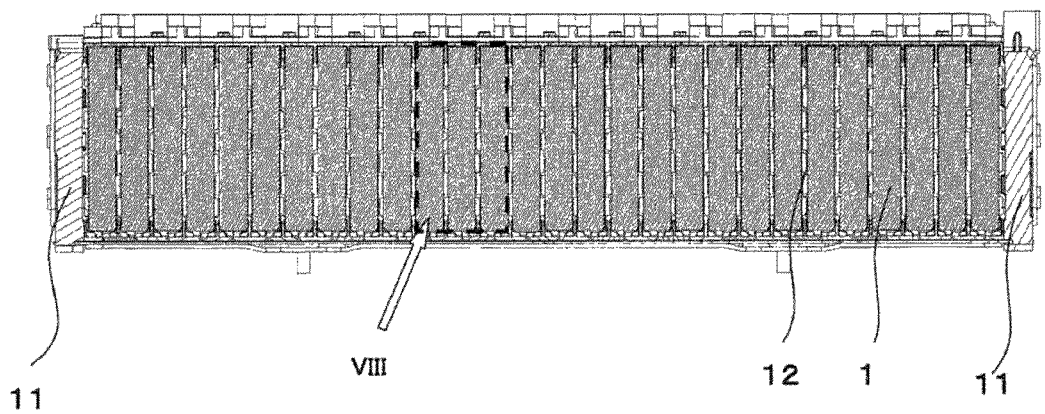
FIG. 7 is a sectional view along a line VII-VII in FIG. 3B.

As shown in FIG. 7 and FIG. 8, the passages (first passages 16a) of the heat exchange gas formed at the first surface side of body part 12a, and the passages (second passages 16b) of the heat exchange gas formed at the second surface side of body part 12a, are formed in an alternating manner from above to below.

Figure 12:
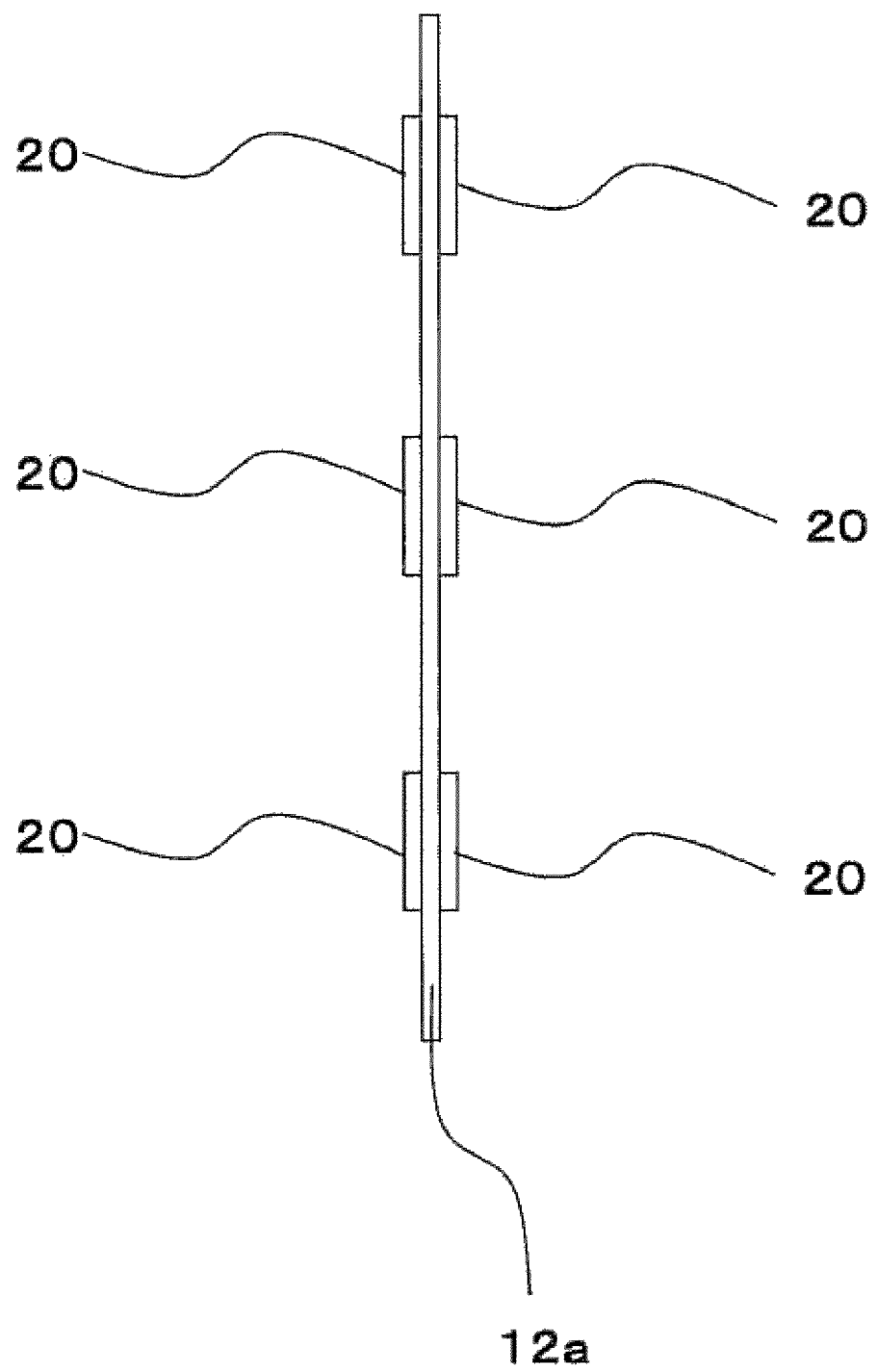
FIG. 12 is a view showing a separator of which projection parts are formed at both surfaces of a body part.

As body part 12a of separator 12 has such a shape, the width (a distance between body part 12a and large area side surface 2a of rectangular battery cell 1) in each of passage 16 is larger than that of a comparison of FIG. 12, when the intervals of rectangular battery cells 1 are equal. As a comparison, it is assumed that projection parts 20 are formed at both surfaces of body part 12a as shown in FIG. 12. Thus, the heat exchange gas easily flows into passages 16a, 16b. Additionally, the heat exchange gas easily flows through passages 16a, 16b. Accordingly, rectangular battery cells 1 are efficiently cooled. Since first passage 16a and second passage 16b are formed in the alternating manner from above to below, both surfaces of rectangular battery cell 1 are cooled equally.

Figure 6A:
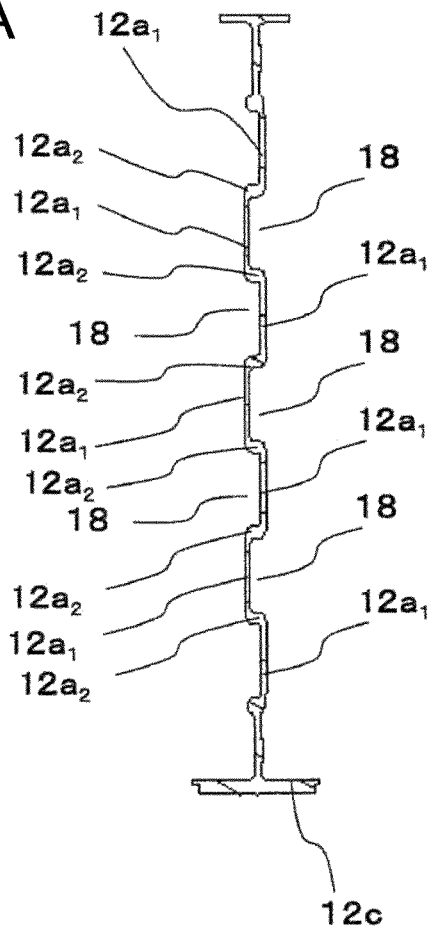
FIG. 6A is a sectional view along a line VI-VI in FIG. 5A.
Figure 6B:
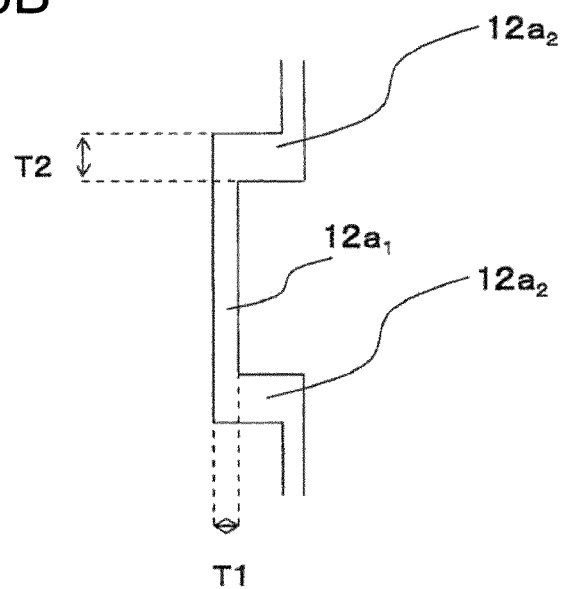
FIG. 6B is an enlarged view of FIG. 6A.

As shown in FIG. 6B, preferably, thickness T2 in the vertical direction of horizontal portion $12a_2$ is larger than thickness T1 in the horizontal direction of vertical portion $12a_1$. Thus, the width of passage 16a, 16b is made wide, and also the strength of body part 12a can be made high. Therefore, when rectangular battery cells 1 are swollen by charge and discharge and separators 12 are pressed, it is surely prevented that passages 16a, 16b of the heat exchange gas are crushed by large deformation of separators 12. Further, body part openings 17 are formed at end parts in the width direction of body part 12a. As body part openings 17 are formed, the heat exchange gas smoothly flows into passages 16, pressure loss can be suppressed.

Figure 4:
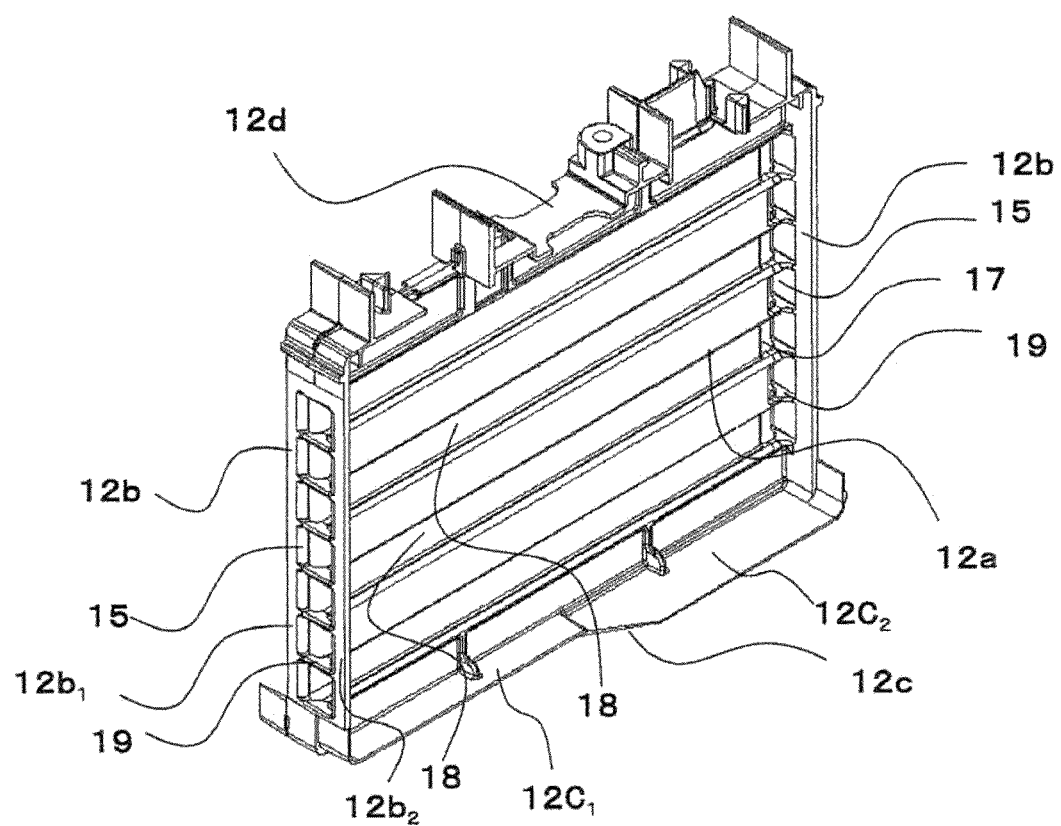
FIG. 4 is a perspective view of a separator used in the assembled battery relating to the embodiment.
Figure 5B:
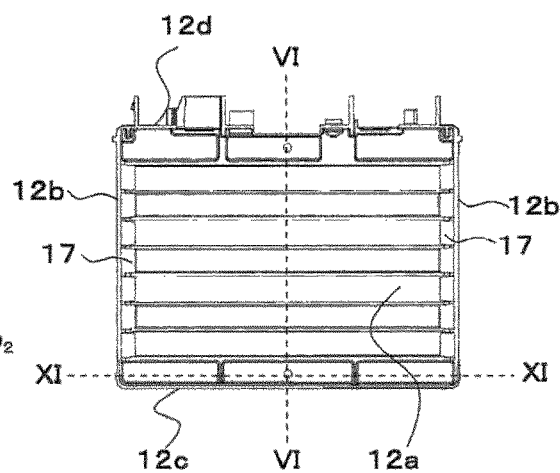
FIG. 5B is a left side view of the separator.
Figure 5A:
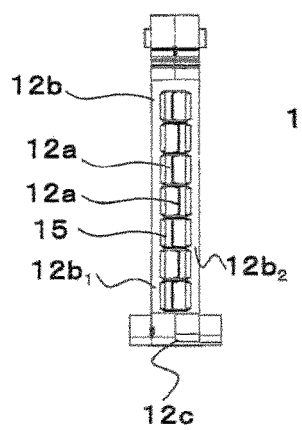
FIG. 5A is a front view of the separator.
Figure 5C:
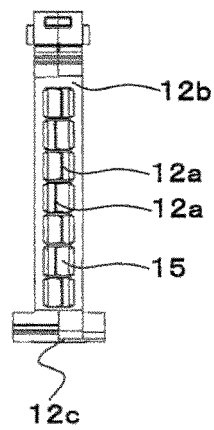
FIG. 5C is a right side view of the separator.

As shown in FIG. 4 and FIG. 5, a pair of side wall parts 12b are formed at both ends in the width direction of body part 12a of separator 12. Side wall parts 12b are disposed so as to extend (project) in the stacked direction of rectangular battery cells 1. Side wall part 12b has first region $12b_1$ projecting from body part 12a toward the first side in the stacked direction of rectangular battery cell 1, and second region $12b_2$ projecting from body part 12a toward the second side. First region $12b_1$ is disposed so as to face small area side surface 2b of rectangular battery cell 1 (the first rectangular battery cell) located at the first surface side of body part 12a. Additionally, second region $12b_2$ is disposed so as to face small area side surface 2b of rectangular battery cell 1 (the second rectangular battery cell) located at the second surface side of body part 12a. Preferably, end parts of side wall part 12b of separator 12 contact end parts of side wall part 12b of adjacent separator 12. Side wall part 12b of separator 12 is made of the same material as body part 12a. Preferably, in side wall part 12b of separator 12, the end part which contacts the end part of side wall part 12b of adjacent separator 12 is also made of the same material as body part 12a.

Figure 9A:
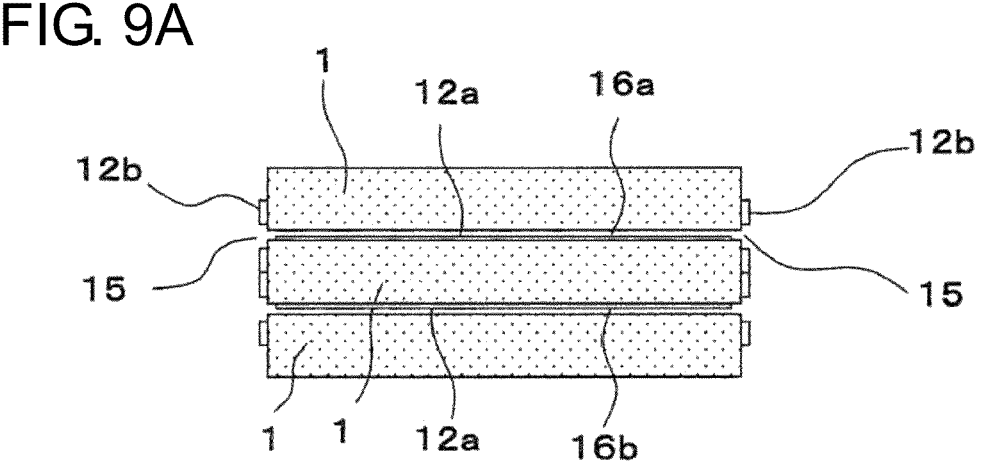
FIG. 9A is a sectional view along a line IXA-IXA in FIG. 8.
Figure 9B:
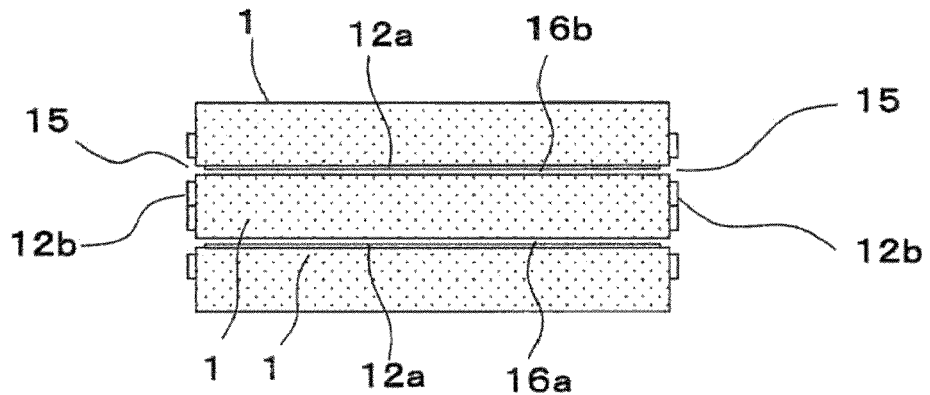
FIG. 9B is a sectional view along a line IXB-IXB in FIG. 8.

Openings 15 are provided in side wall part 12b of separator 12. These openings 15 are formed so as to extend in first regions $12b_1$ and second regions $12b_2$. Openings 15 are formed so as to couple the outer side of side wall part 12b and passages 16a, 16b. As shown in FIG. 9A and FIG. 9B, openings 15 which are provided at a first side wall part 12b in the width direction of body part 12a, passages 16a or 16b, and openings 15 which are provided at a second side wall part 12b in the width direction of body part 12a, are connected with consecutive space (i.e., connected to form continuous passages). Thus, the heat exchange gas flows into passages 16a, 16b from openings 15 at the first end side of separator 12, and then the heat exchange gas is exhausted from openings 15 at the second end side of separator 12.

Figure 13:
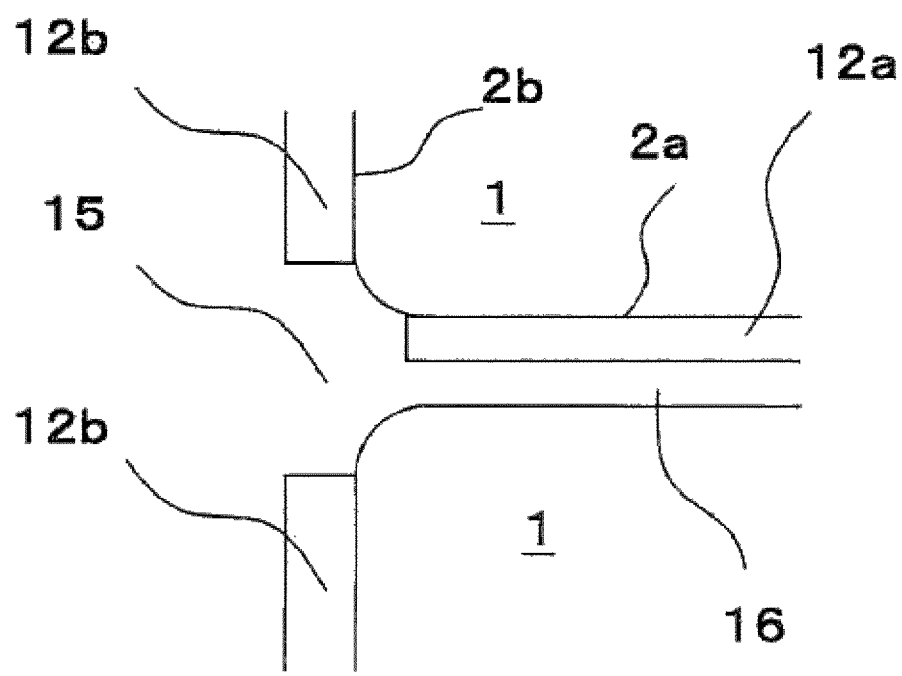
FIG. 13 is an enlarged view in a vicinity of an opening of FIG. 9B.

Preferably, both small area side surfaces 2b of first rectangular battery cell 1 and small area side surface 2b of second rectangular battery cell 1, are exposed from openings 15 in one side wall part 12b. When gas flows from a wide space to a narrow space, a speed of the gas changes. Then the more rapidly a cross sectional area of a passage through which the gas flows changes, the more largely a speed of the gas changes. Then, it may be difficult for the gas to flow smoothly. In contrast, when both small area side surface 2b of a first rectangular battery cell 1 and small area side surface 2b of a second rectangular battery cell 1 are exposed from openings 15 in one side wall part 12b as shown in FIG. 13, the cross sectional area of the passages 16a, 16b through which the gas flows can gradually become small. Therefore, in this structure, the heat exchange gas can smoothly flow without the gas speed largely changing. As shown in FIG. 13, in rectangular outer case 2 of rectangular battery cell 1, preferably, a rounded part is formed in a portion which connects large area side surface 2a and small area side surface 2b. Thus, the cross sectional area of the passage through which the gas flows can change smoothly from openings 15 to passages 16a, 16b.

Figure 10:
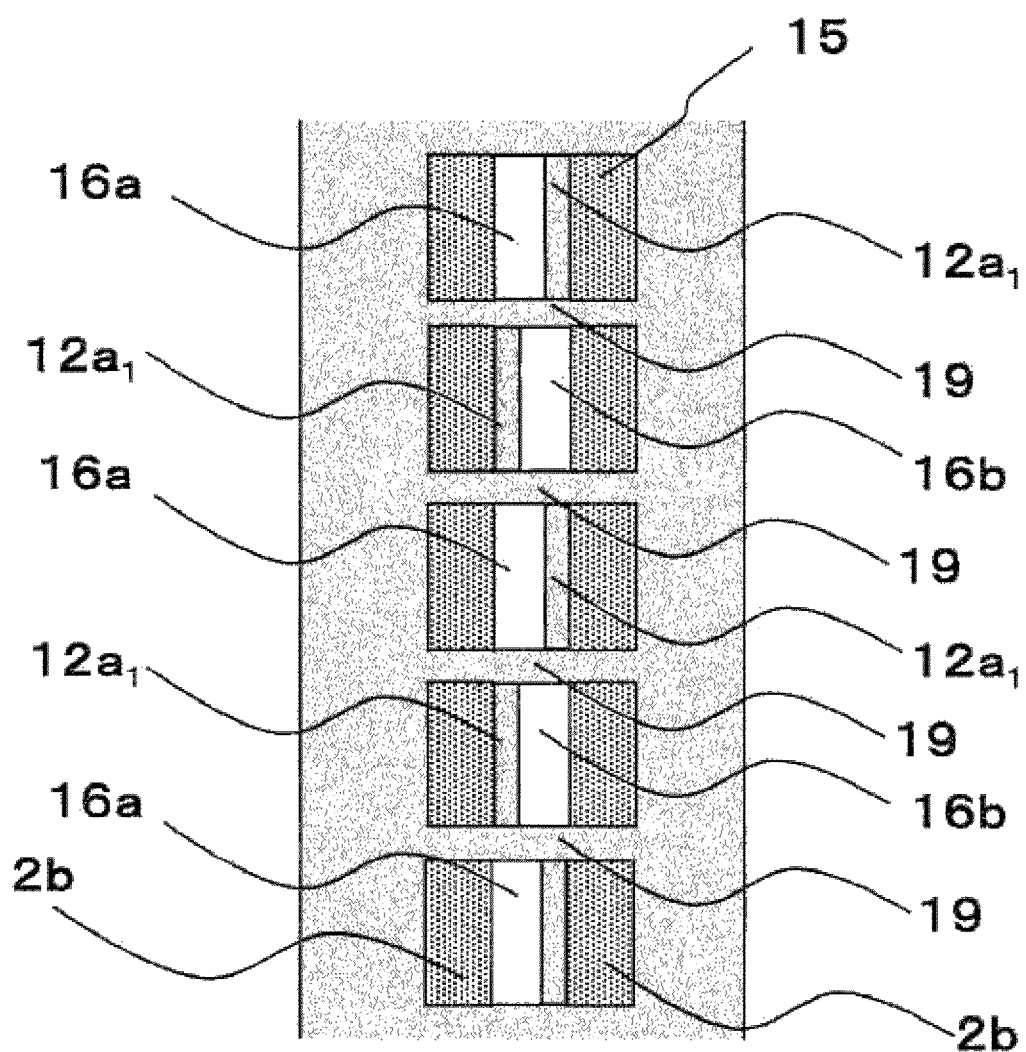
FIG. 10 is an enlarged view of a X portion in FIG. 3A.

A plurality of openings 15 are arranged in one row vertically at side wall part 12b. As shown in FIG. 10, openings 15 communicating with first passages 16a and openings 15 communicating with second passages 16b are arranged in an alternating manner from above to below. Thus, rectangular battery cell 1 can be more uniformly cooled.

It is preferable that a rounded part is provided at an edge portion of each opening 15. Thus, the heat exchange gas easily flows into passages 16a, 16b. Separating wall 19 separates adjacent openings 15. It is preferable that a thickness of separating wall 19 in a depth direction is bigger than a thickness of separating wall 19 in the vertical direction. By this structure, the cross sectional area of passages 16a, 16b is made large, and the strength of separator 12 can be made high.

It is preferable that binding bars 13 are respectively disposed at side surfaces of assembled battery 10 (see FIGS. 3A and 3B). Preferably, each binding bar 13 includes main part 13a, and bending parts 13b formed at an upper end part and a lower end part of main part 13a respectively. Main part 13a is disposed so as to face the side surface of assembled battery 10. Bending part 13b formed at the upper end part of main part 13 is disposed on the upper surface of assembled battery 10. Bending part 13b formed at the lower end part of main part 13 is disposed on the lower surface of assembled battery 10. Here, bending part 13b may be provided only at the upper end part of body part 13a. In the structure where binding bar 13 is disposed at the side surface of assembled battery 10, when binding bar 13 is pressed to small area side surface 2b of rectangular battery cell 1 from the outside, binding bar 13 may be deformed, and may contact small area side surface 2b of rectangular battery cell 1. Then, normally, rectangular outer case 2 and binding bar 13 are both made of metal. It is assumed that binding bar 13 contacts small area side surfaces of the plurality of rectangular battery cells 1, and rectangular outer cases 2 of the plurality of rectangular battery cells 1 may be short-circuited through binding bar 13. In contrast, in assembled battery 10 relating to the embodiment, separator 12 has side wall part 12b and openings 15 at side wall part 12b, and the heat exchange gas flows into passages 16 through openings 15. Thus, more area of small area side surface 2b of rectangular battery cell 1 can be covered with side wall part 12b, while the heat exchange gas easily flows into passage 16. Accordingly, cooling efficiency of rectangular battery cell 1 is not decreased, and the short circuit by binding bar 13 can be prevented, and so an assembled battery having a high reliability can be obtained. Here, it is preferable that a height of side wall part 12b of separator 12 is bigger than a height of small area side surface 2b of rectangular battery cell 1. Preferably, 60% or more in the area of small area side surface 2b of rectangular battery cell 1, more preferably 70% or more is covered with side wall part 12b of separator 12. It is preferable that bending part 13b of binding bar 13 is disposed so as to contact separator 12.

Figure 11A:
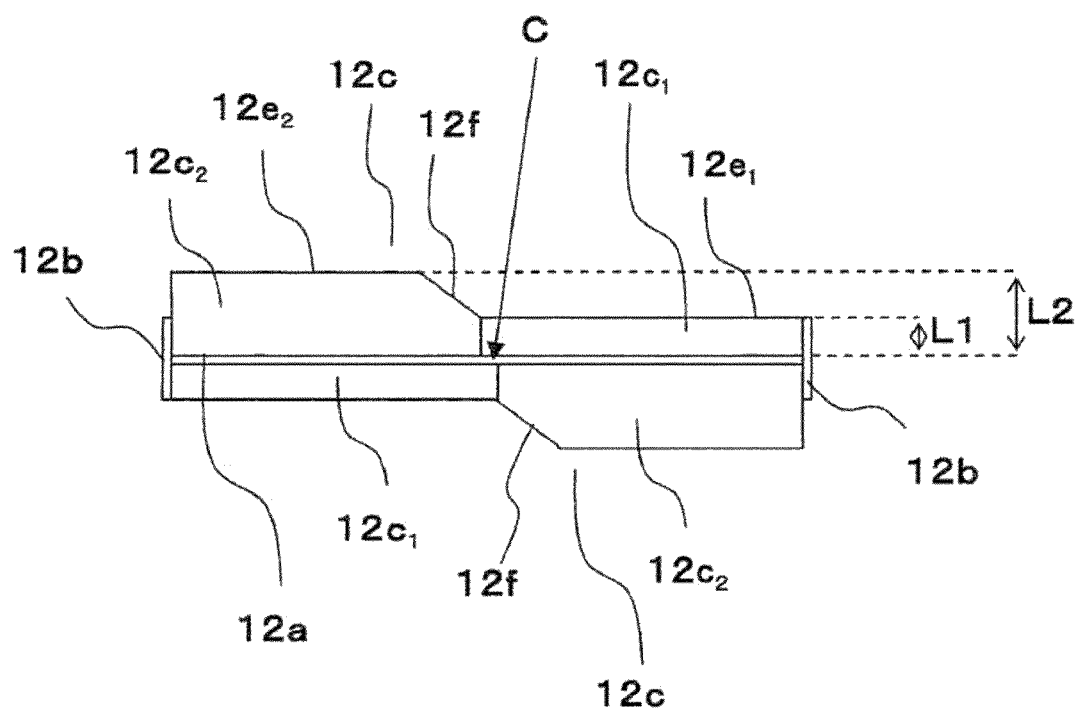
FIG. 11A is a sectional view along a line XI-XI in FIG. 5A.
Figure 11B:
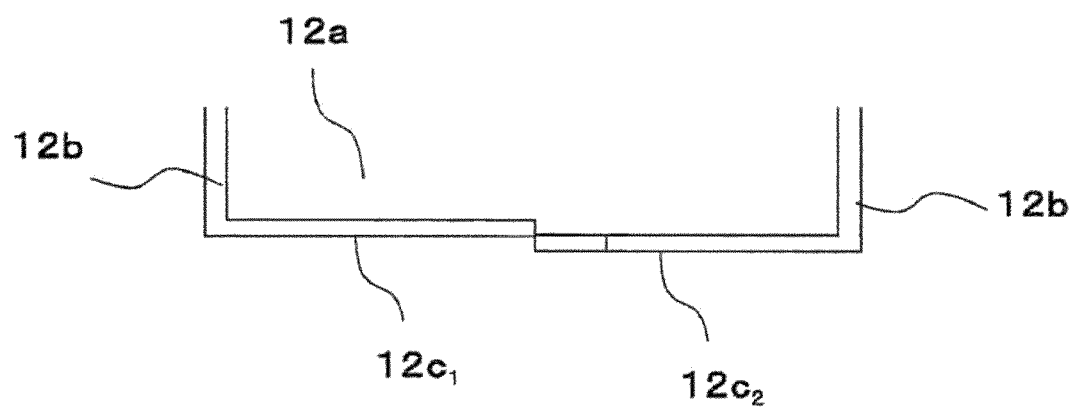
FIG. 11B is an enlarged view in a vicinity of a bottom part.

As shown in FIG. 4, FIG. 11A, and FIG. 11B, it is preferable that separator 12 has bottom part 12c. Bottom part 12c is formed at the lower end of body part 12a so as to extend in the stacked direction of rectangular battery cells 1. Bottom part 12c is disposed so as to face bottom surface 2c of rectangular battery cell 1. In the first surface side of body part 12a, bottom part first region $12c_1$ is provided at one side in the width direction of body part 12a, and bottom part second region $12c_2$ is provided at the second side. As shown in FIG. 11B, bottom part first region $12c_1$ is located slightly higher than bottom part second region $12c_2$. In the stacked direction of the rectangular battery cell 1, a distance L2 from body part 12a to end part $12e_2$ of bottom part second region $12c_2$, is larger than a distance L1 from body part 12a to end part $12e_1$ of bottom part first region $12c_1$. Thus, in a state of the assembled battery, bottom part second region $12c_2$ of adjacent other separator is disposed at a lower surface side of bottom part first region $12c_1$ such that bottom part first region $12c_1$ of the first separator 12 and the bottom part second region $12c_2$ of the second separator 12 overlap each other. Also, bottom part first region $12c_1$ of the adjacent second separator is disposed at an upper surface side of bottom part second region $12c_2$ such that bottom part second region $12c_2$ of the first separator 12 and bottom part first region $12c_1$ of the second separator are overlapped. Thus, bottom parts 12c of the adjacent separators are connected such that they are fitted to each other.

In this configuration, when water is formed by dew condensation or the like on a floor surface where the assembled battery is mounted, dew condensation water is prevented from intruding into the bottom surface side of rectangular battery cell 1 through a space between separators 12. Therefore, rectangular outer case 2 of rectangular battery cell 1 is not covered with insulation film or the like, and a short circuit between rectangular outer cases 2 of rectangular battery cell 1 by dew condensation water can be prevented. Here, in bottom part second region $12c_2$, ⅓ or more of the distance L2 from end part $12e_2$ toward body part 12a, more preferably 4/10 or more, overlaps with bottom part first region $12c_1$ of the second separator 12. Thus, dew condensation water can be effectively prevented from intruding.

The end part of bottom part second region $12c_2$ in the stacked direction of the rectangular battery cells has an inclined part 12f where distances from body part 12a gradually become small. Thus, since adjacent separators 12 are connected such that inclined parts 12f contact each other, assembling is carried out smoothly without catching between them at a time of assembling the assembled battery. For example, when it is assumed that end part of body part 12a extends perpendicularly to body part 12a without inclined part 12f, bottom parts 12c of separators 12 may catch each other at a time of assembling the assembled battery, and then assembling may not be carried out smoothly.

As shown in FIG. 11A, preferably, separator part 12c of separator 12 has a point symmetrical shape in a plan view, with respect to a center C in the width direction of body part 12a as center C of symmetry. At the one surface side of body part 12a, bottom part first region $12c_1$ and bottom part second region $12c_2$ are formed. Also at the other surface side of body part 12a, bottom part first region $12c_1$ and bottom part second region $12c_2$ are formed. Bottom part first region $12c_1$ located at the one surface side of body part 12a, faces bottom part second region $12c_2$ located at the other surface side of body part 12a through body part 12a. Also, bottom part second region $12c_2$ located at the one surface side of body part 12a, faces bottom part first region $12c_1$ located at the other surface side of body part 12a through body part 12a. Thus, bottom parts 12c of adjacent separators 12 are easily fitted each other.

As shown in FIG. 4, separator 12 has upper wall part 12d at the upper end of body part 12a. This upper wall part 12d is disposed so as to face sealing plate 3 of rectangular battery cell 1. In upper wall part 12d, openings or a cut-out are provided at locations facing positive terminal 4, negative terminal 5, and gas exhaust valve 8. However, in separator 12, upper wall part 12d may be omitted or may not be provided at the location or the vicinity facing gas exhaust valve 8.

[Others]

The material of the separator is not limited specifically, but preferably has an electrical insulation property. Especially, it is preferable that it is made of a resin. The separator is more preferably made of polybutylene terephthalate (PBT), polyamide (PA), polycarbonate (PC), polypropylene (PP). When the rectangular outer case is made of metal, outer surfaces may be covered with resin film or the like. Thus, in the present invention, it is not necessary that the small area side surface of the rectangular outer case directly faces the side wall part of the separator, and so the small area side surface of the rectangular outer case may face the side wall part of the separator through resin film. The type of heat exchange gas is not limited specifically, but it is preferable to use air. Instead of making cooling gas as heat exchange gas flow, by making hot gas flow through passages, rectangular battery cell 1 can be heated. In this case, according to the present invention, rectangular battery cell 1 can efficiently be heated. It is more preferable that the assembled battery described above is used for a vehicle.

The invention claimed is:
1. An assembled battery comprising:
a pair of end plates; and
a plurality of rectangular battery cells stacked through separators, the battery cells being located between the pair of end plates,
wherein each of the rectangular battery cells has a bottom surface, a pair of large area side surfaces, and a pair of small area side surfaces,
wherein each of the separators has a body part and a pair of side wall parts each provided at a respective end of the body part with respect to a width direction,
wherein the body part is disposed between adjacent battery cells of the plurality of rectangular battery cells,
wherein the body part has vertical portions vertically extending in an alternating manner from above to below and a horizontal portion horizontally extending, and an end part of each of the vertical portions is connected to an end part of the horizontal portion,
wherein a first passage through which heat exchange gas passes is formed between a first surface of the body part of each of the separators and a first adjacent battery cell of the plurality of rectangular battery cells,
wherein a second passage through which heat exchange gas passes is formed between a second surface of the body part of each of the separators and a second adjacent battery cell of the plurality of rectangular battery cells,
wherein the first passage and the second passage are provided in an alternating manner from above to below, wherein the side wall parts of each of the separators are disposed so as to face the small area side surfaces of two adjacent rectangular battery cells, wherein each of the side wall parts has a plurality of openings, the openings of each of the side wall parts being arranged in a vertical direction such that each of the openings is separated from an adjacent one of the openings by a wall, wherein at least one of the first passage and the second passage are exposed through the openings, wherein each of the side wall parts of each of the separators has a first region extending from a first surface side of the respective separator toward the first adjacent battery cell, and has a second region extending from a second surface side of the respective separator toward the second adjacent battery cell, and wherein (i) one of the small area side surfaces of the first adjacent battery cell located at the first surface side of the respective separator, and (ii) one of the small area side surfaces of the second adjacent battery cell located at the second surface side of the respective separator are exposed through the openings in a first one of the side wall parts of the respective separator.

2. An assembled battery comprising:
a pair of end plates; and
a plurality of rectangular battery cells stacked through separators, the battery cells being located between the pair of end plates, wherein each of the rectangular battery cells has a bottom surface, a pair of large area side surfaces, and a pair of small area side surfaces, wherein each of the separators has a body part and a pair of side wall parts each provided at a respective end of the body part with respect to a width direction, wherein the body part is disposed between adjacent battery cells of the plurality of rectangular battery cells, wherein the body part has vertical portions vertically extending in an alternating manner from above to below and a horizontal portion horizontally extending, and an end part of each of the vertical portions is connected to an end part of the horizontal portion, wherein a first passage through which heat exchange gas passes is formed between a first surface of the body part of each of the separators and a first adjacent battery cell of the plurality of rectangular battery cells, wherein a second passage through which heat exchange gas passes is formed between a second surface of the body part of each of the separators and a second adjacent battery cell of the plurality of rectangular battery cells, wherein the first passage and the second passage are provided in an alternating manner from above to below, wherein the side wall parts of each of the separators are disposed so as to face the small area side surfaces of two adjacent rectangular battery cells, wherein each of the side wall parts has a plurality of openings, the openings of each of the side wall parts being arranged in a vertical direction such that each of the openings is separated from an adjacent one of the openings by a wall, wherein at least one of the first passage and the second passage are exposed through the openings, wherein each of the side wall parts of each of the separators has a first region extending from a first surface side of the respective separator toward the first adjacent battery cell, and has a second region extending from a second surface side of the respective separator toward the second adjacent battery cell, wherein the first passage and the second passage are exposed through the openings in a first one of the side wall parts of the respective separator, and wherein a first one of the openings through which the first passage is exposed, and a second one of the openings through which the second passage is exposed, are provided in an alternating manner from above to below.

3. An assembled battery comprising:
a pair of end plates; and
a plurality of rectangular battery cells stacked through separators, the battery cells being located between the pair of end plates, wherein each of the rectangular battery cells has a bottom surface, a pair of large area side surfaces, and a pair of small area side surfaces, wherein each of the separators has a body part and a pair of side wall parts each provided at a respective end of the body part with respect to a width direction, wherein the body part is disposed between adjacent battery cells of the plurality of rectangular battery cells, wherein the body part has vertical portions vertically extending in an alternating manner from above to below and a horizontal portion horizontally extending, and an end part of each of the vertical portions is connected to an end part of the horizontal portion, wherein a first passage through which heat exchange gas passes is formed between a first surface of the body part of each of the separators and a first adjacent battery cell of the plurality of rectangular battery cells, wherein a second passage through which heat exchange gas passes is formed between a second surface of the body part of each of the separators and a second adjacent battery cell of the plurality of rectangular battery cells, wherein the first passage and the second passage are provided in an alternating manner from above to below, wherein the side wall parts of each of the separators are disposed so as to face the small area side surfaces of two adjacent rectangular battery cells, wherein each of the side wall parts has a plurality of openings, the openings of each of the side wall parts being arranged in a vertical direction such that each of the openings is separated from an adjacent one of the openings by a wall, wherein at least one of the first passage and the second passage are exposed through the openings, wherein each of the side wall parts of each of the separators has a first region extending from a first surface side of the respective separator toward the first adjacent battery cell, and has a second region extending from a second surface side of the respective separator toward the second adjacent battery cell, wherein each of the separators has a bottom part at a low end part of the main body, wherein the bottom part is disposed so as to face the bottom surface of a first one of the rectangular battery cells, wherein the bottom part has a bottom part first region and a bottom part second region, the bottom part first region being located higher than the bottom part second region, wherein the bottom part first region is disposed at an upper surface side of the bottom part second region of a first adjacent separator of the separators, and wherein the bottom part second region is disposed at a lower surface side of the bottom part first region of a second adjacent separator of the separators.

4. The assembled battery according to claim 3, wherein a distance from the body part to an end part of the bottom part second region in a stacked direction of the rectangular battery cells is larger than a distance from the body part to an end part of the bottom part first region in the stacked direction of the rectangular battery cells.

5. The assembled battery according to claim 4, wherein the end part of the bottom part second region in the stacked direction of the rectangular battery cells has an inclined part where distances from the body part gradually become small.

* * * * *